United States Patent [19]

Toelle

[11] 4,164,206
[45] Aug. 14, 1979

[54] CLOSED LOOP PROGRAMMABLE EGR WITH COOLANT TEMPERATURE SENSITIVITY

[75] Inventor: Alvin D. Toelle, Fenton, Mich.

[73] Assignee: The Bendix Corporation, Southfield, Mich.

[21] Appl. No.: 870,966

[22] Filed: Jan. 19, 1978

[51] Int. Cl.² .................................. F02M 25/06
[52] U.S. Cl. ........................................ 123/119 A
[58] Field of Search .......................... 123/119 A

[56] References Cited

U.S. PATENT DOCUMENTS

| | | | |
|---|---|---|---|
| 3,799,133 | 3/1974 | Frank | 123/119 A |
| 3,872,846 | 3/1975 | Taplin et al. | 123/119 A |
| 3,915,134 | 10/1975 | Young et al. | 123/119 A |
| 3,963,011 | 6/1976 | Saito et al. | 123/119 A |
| 3,969,614 | 7/1976 | Moyer et al. | 123/119 A |
| 3,982,395 | 9/1976 | Hasegawa et al. | 123/119 A |
| 4,024,847 | 5/1977 | Koganemaru | 123/119 A |
| 4,044,738 | 8/1977 | Williams et al. | 123/119 A |
| 4,052,968 | 10/1977 | Hattori et al. | 123/119 A |
| 4,071,003 | 1/1978 | Aono | 123/119 A |

Primary Examiner—Wendell E. Burns
Attorney, Agent, or Firm—William A. Marvin

[57] ABSTRACT

A closed loop programmable EGR control system is disclosed. The EGR control system comprises a first read only memory having a look up table of base EGR pulse widths as a function of engine speed and absolute manifold pressure. This base EGR pulse width is corrected to a total desired pulse width by adding a correction pulse width obtained from a second read only memory. The second ROM stores values of the correction pulse width in a look up table as a function of engine speed and engine coolant temperature. This desired value of EGR pulse width is then compared to the actual EGR flow as sensed directly by a differential pressure transducer located in the exhaust gas recirculation conduit and an error signal is generated therefrom. The error signal is subsequently used to operate a solenoid pilot valve that alternately applies either a vacuum or atmospheric vent at a controllable rate to an EGR valve regulating the amount of exhaust gas recirculated to thereby reduce the error between the actual and desired EGR values.

13 Claims, 4 Drawing Figures

CLOSED LOOP PROGRAMMABLE EGR WITH COOLANT TEMPERATURE SENSITIVITY

CROSS REFERENCE TO RELATED APPLICATIONS

This application is related to an application Ser. No. 855,493 which was filed on Nov. 28, 1977 in the name of Alvin Dan Toelle entitled "Closed Loop Exhaust Gas Recirculation system," and to an application Ser. No. 837,657 which was filled on Sept. 29, 1977 in the names of John Jacob Schira, Alvin Dan Toelle and Jack Ralph Phipps entitled "Closed Loop Exhaust Gas Recirculation Control System"; both of which are commonly assigned with the present invention, the disclosures of which are herein expressly incorporated by reference.

BACKGROUND OF THE INVENTION

1. Field of the Invention

The invention relates generally to exhaust gas recirculation systems for emission control of internal combustion engines and is more particularly related to a closed loop EGR system programmable with engine operating parameters that is insensitive to environmental variations and aging.

2. Prior Art

It is conventional in the art to provide an exhaust gas recirculation (EGR) system for an internal combustion engine to reduce the emissions of $NO_x$ components. Known systems generally comprise a recirculation conduit connecting a source of exhaust gas to the induction source of the engine and a controllable valve device for regulating the amount of exhaust gas allowed to pass through the conduit.

The production of the $NO_x$ components in the emissions of an internal combustion engine is caused mainly by elevated combustion temperatures and pressures. EGR systems essentially reduce both of these to levels less conducive to the formation of the $NO_x$ components in two ways. Primarily exhaust gas contains numerous inert elements such as $N_2$, $H_2O$, and $CO_2$ which because of their molar specific heats will absorb substantial thermal energy from the operating cycle. The dilution of inducted air and fuel with a portion of exhaust gas will additionally cause proportionately less $O_2$ in the resulting mixture and secondary cooling will occur from uncombusted fuel. With lower combustion temperature and smaller amounts of fuel being combusted, the combustion pressures will, of course, decrease also.

However, while the formation of the $NO_x$ components decreases with the recirculation of larger amounts of exhaust gas, the performance of the engine as measured by such parameters as power and driveability decreases also. Generally, for different operating conditions of the engine varying amounts of EGR will be optimum but it is understood that the maximum amount of dilution is in the range of 20 percent of the mixture constituents before driveability becomes unacceptable. Therefore, the problem exists of how to position the EGR valve to provide the maximum suppression of $MO_x$ constituents without affecting the performance of the engine over a wide range of operating conditions.

Most of the prior art attempts to solve this basic problem by mechanically positioning the valve in relation to a single operating parameter indicative of the amount of inducted mixture, one of the most advantageous of these parameters being manifold absolute pressure. Others include throttle position, RPM, air/fuel ratio, etc. By sensing an operating parameter and using it as a position indicator such a system contemplates mixing a constant percentage of exhaust gas with the inducted mixture at the various engine operating conditions. Generally, the constant is picked around the maximum recirculation amount of 20 percent and is not the optimum for all operating conditions.

Further, rather than the desired constant amount of EGR designed for, such a positioning scheme may actually give fairly unpredictable results because the amount of exhaust gas recirculation flow depends not only on the position of the valve but also significantly on the pressure in the exhaust manifold source. The range of speed and load conditions required of the modern engine will alter this pressure and the actual amount of EGR for any given position of the valve. Changes in altitude, barometric pressures, and the like can further cause discrepancies.

Other items which affect EGR differential valve pressure are tolerance, wear, and other aging conditions of any mechanical system. As one example, exhaust gas deposits or accumulations in the tail pipe can increase back pressures and accumulations on the valve itself will change the amount of EGR flow for the identical positionings of the valve at different times. Many systems provide compensation for some of these changing conditions by altering the position of the valve in combination with the main sensed parameter.

Closed loop control systems for controlling various parameters of an internal combustion engine are known in the art, as are the above-identified EGR control systems, even though the prior art does not include many EGR control systems employing a closed loop mode for operation. U.S. Pat. No. 3,872,846 issued to L. B. Taplin et al. on Mar. 25, 1975 for an Exhaust Gas Recirculation (EGR) Internal Combustion Engine Roughness Control System is one example and is assigned to the assignee of the present invention. The disclosure of Taplin is hereby expressly incorporated herein by reference. This patent teaches a closed loop internal combustion engine control system provided for controlling the exhaust gas recirculation flow so as to regulate engine roughness at a predetermined level. The closed loop control system of this patent receives input signals indicative of the engine roughness and generates therefrom an EGR value command signal for varying the position of an EGR valve so as to effect the maximum possible EGR flow compatible with a predetermined maximum level of permissible engine roughness.

Programmable EGR systems as noted in the above cross referenced applications are advantageously used for providing flexibility in positioning an EGR valve and regulating recirculation gas flow in a closed loop manner. However, an improved EGR system could be developed if the actual EGR flow could be measured and combined with such a programmable closed loop control.

SUMMARY OF THE INVENTION

A closed loop programmable EGR control system is provided by the invention. The system includes an electronic procesor means for generating a desired EGR value as a function of the operating parameters of an internal combustion engine.

In a preferred embodiment the electronic processor means comprises a first read only memory having a look up table of base EGR pulse widths as a function of engine speed and manifold absolute pressure. This base EGR pulse width is corrected to a total desired pulse width by adding a correction pulse width obtained from a second read only memory. The second ROM stores values of the correction pulse width in a look up table as a function of engine speed an engine coolant temperature.

The electronic processor means provides a facile means for generating the desired EGR value as a programmed parameter. A mapping of engine speed and manifold absolute pressure as a base value for EGR is an accurate measure of engine driving conditions where load and speed conditions are taken into account. EGR flow can be programmed on such a mapping so that power and driveability do not decrease beyond unacceptable minimums while maintaining emission control. The EGR correction value as a mapping of engine coolant can be programmed to reduce emissions when $NO_x$ increases to undesirable levels with elevated engine temperatures.

The EGR control system further includes control means for regulating the amount of exhaust gas recirculated through a recirculation loop. The control means includes a means for comparing the desired EGR value with an actual EGR value that is provided by sensing the actual EGR flow through the recirculation loop. The comparison means provides an error signal which causes the control means to increase the EGR flow if the actual EGR value is less than the desired EGR value and to decrease the EGR flow if the actual EGR value is greater than the desired EGR value.

By sensing the actual EGR flow through the recirculation loop, th control system will not be susceptible to the aging problems found in some of the prior art systems. Moreover, complex compensation techniques for differential pressure changes between the exhaust gas and induction manifold wll not be needed as the system is self compensating. Sensing actual EGR flow will further produce a more accurate value for control of the desired dilution which is necessary for compatibility with the power of the processor means.

Therefore, it is an object of the present invention to provide a closed loop programmable EGR control system.

It is another object of the invention to provide such a control system sensing the actual EGR flow through the recirculation loop of the system.

It is a further object of the invention to provide an EGR control system that improves driveability without sacrificing emission control.

It is still another object of the invention to provide a programmable mapping of speed and manifold absolute pressure to produce a desired EGR value.

It is yet another object of the invention to provide a programmable mapping of engine temperature to produce a correction to the desired EGR value.

These and other objects, features, and aspects of the invention will be more fully understood from the detailed description of the preferred embodiment when taken in conjunction with the appended drawings wherein:

DETAILED DESCRIPTION

Figure 1:
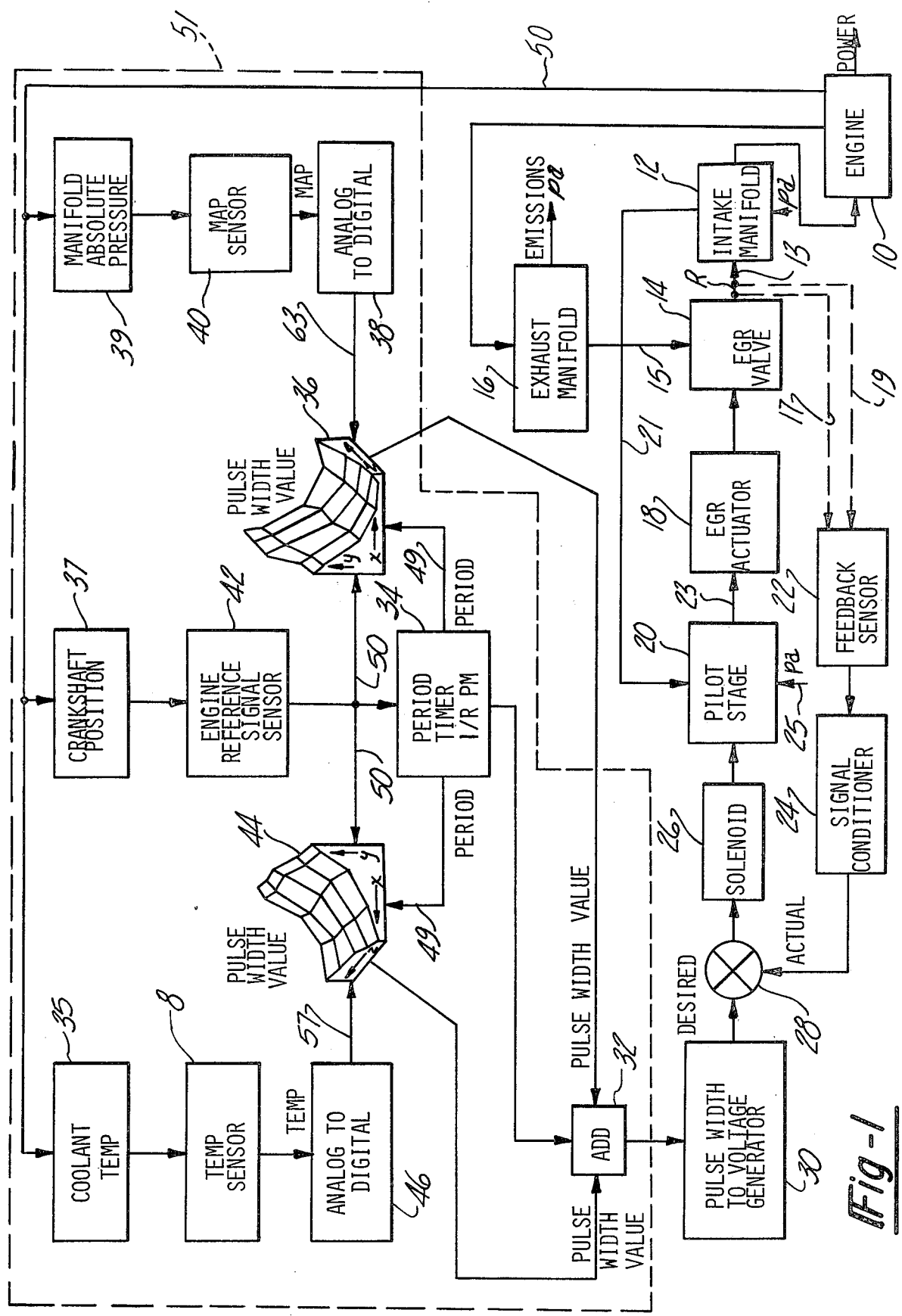
FIG. 1 is a detailed schematic and block diagram of a closed loop EGR system which is programmable and incorporates the present invention.

With rerference to FIG. 1 there is shown a programmable EGR control system for an internal combustion engine generally designated by numeral 10. The internal combustion engine 10 includes an intake manifold 12 for ingesting air and fuel into the combustion cylinders of the engine and an exhaust manifold 16 for discharging the combustion products once the process has taken place. As is conventional for many EGR systems, the engine 10 has an exhaust gas recirculation loop comprising an exhaust gas pickup conduit 15, an EGR valve 14 and an intake manifold conduit, or input conduit 13, connected to the intake manifold 12. The exhuast pickup conduit 15 and the input manifold conduit 13 are separated by the EGR valve 14 and recirculate a portion of the exhaust gases through the loop and into the engine in response to controlled movement or openings by the EGR valve. The exhaust pressure between the exhaust manifold 16 and the negative pressure or vacuum pressure of the intake manifold 12 will provide for the recirculation of exhaust gas to take place in the direction indicated by the arrows in FIG. 1.

An electromechanical controller for the EGR system includes a comparator means 28 electrically operating solenoid 26 to open a pilot stage 20 and thereby control an EGR actuator 18. The actuator 18 incrementally moves the EGR valve 14 between a full open and a full closed position to vary the percentage of exhaust gas recirculated.

A desired EGR signal value is compared with an actual EGR signal value in the comparator means 28 to yield an error signal having a first level if the desired value is greater than the actual value or a second level if the desired value is less than the actual value. These two levels control the solenoid 26 to either open the pilot stage 20 to a source of vacuum or a source of atmospheric pressure Pa, (vent). The vacuum source may be readily obtained via a pressure conduit 21 form the vacuum of the intake manifold. Depending on the signal from the comparator means 28, either the vacuum or the atmospheric pressure is applied incrementally at a constant rate to the EGR actuator 18 to move the valve at the constant rate.

The actual EGR signal is developed by a feedback sensor 22 supplying an electrical signal, or an analog voltage signal, representative of the mass flow of EGR through the intake conduit 13. This signal can be conditioned by a signal conditioner 24, which applies a limiting function, which will be more fully described hereinafter. The sensing of the mas flow of EGR is an extremely accurate representation of the actual EGR flow and is independent of back pressure, aging, etc.

In the preferred embodiment the feedback sensor 22 is a differential pressure sensor having one pressure input through a pressure sensor conduit 17 and another through pressure sensor conduit 19. The pressure sensor conduits 17 and 19 are located on either side of a restriction (R) in the exhaust gas input conduit 13 and produce an indication of the mass flow of the exhaust gas recirculating therethrough by the pressure difference between them.

The governing equation of mass air flow, assuming subsonic flow across the restriction, is:
EGR Mass air flow $$\Delta\ C_d\ A\ (P_1/\sqrt{T}) \times (P_2/P_1)^{1/k} \sqrt{1-(P_2/P_1)}\ k-1/k$$

where
$C_d$ is an air flow constant for a restriction of the geometry proposed
k is specific heat ratio for the exhaust gas
A is the fixed orifice area
$P_2$ is the pressure downstream of the restriction, and a function of manifold absolute pressure
T is the EGR gas temperature (K.°) and assumed to remain constant for fixed values of MAP and engine speed
$P_1$ is the pressure upstream of the restriction and equal to MAP + ΔP Since for a known MAP the only unkown variable in the equation is ΔP, then a measure of the mass EGR flow through the recirculation loop is the pressure difference ΔP. The output of the sensor is then an analog signal voltage representative of the actual EGR flow through the recirculation loop.

The desired EGR value is calculated from a set of engine operating parameters sensed from the engine 10 via parameter lines 50 by an electronic processor means 51. The output of the electronic processor means is a pulse width value where the length of the pulse is indicative of the desired amount of EGR that should be recirculated for the parameters sensed. These pulse widths are communicated to a pulse width to voltage generator 30 to produce than analog voltage that is input into the comparator means 28 as the desired EGR signal value. The processor means could additionally include digital-to-analog conversion means to provide the desired EGR value as an analog voltage directly. The pulse width modulation, however, is more facile while using a RPM time base as will be more fully described hereinafter.

The electronic processor means 51 will now be more fully described where a temperature sensor 8 is connected to the engine 10 and produces an analog voltage representative of the coolant temperature 35 of the engine for all periods of time. This analog voltage, in the preferred embodiment, is converted into a digital number by a conventional A/D converter 46. Likewise, a second operating parameter, manifold absolute pressure 39, is sensed from the actual condition of the engine by a MAP sensor 40 which produces an analog voltage varying with the sensed pressure. This voltage is transmitted to the A/D converter 38 to be converted into a digital number for further processing by the processor means. A third input to the processor means is the crankshaft position 37, which is sensed by an engine reference sensor 42 which provides an output which is indicative of an event occurring on the crankshaft. By dividing by the correct number of events per cycle or period, a period timer 34 may produce a period 10 signal that is indicative of the actual RPM of the engine 10.

The electronic processor means 51 will take the first operating parameter via the digital number output from A/D converter 38 and the RPM signal produced by the period timer 34, and apply these values against a mapping function 36 to produce a pulse width value for EGR as a function of these two variables. The mapping function is implemented in a preferred form by storing the pulse width values (PW) for the first operating parameter in a memory whereby the memory location will be the ordinant value, y, of the mapping function, and the address for the first dimension of the memory will be the abscissa value, x, of the period from the period timer 34, and the z value of the mapping function indicating a MAP value will be associated with the second dimension of the memory.

Likewise, the EGR pulse widths are stored in a mapping function 44 for the second operating parameter of coolant temperature where the pulse widths (PW) are EGR values stored in memory locations corresponding to y values of the mapping function and are addressed by correlating the first dimension of the memory to the period or RPM number, x, while the second dimension is addressed by the digital number representing the temperature at the z value of the function.

The EGR pulse width operating values from the mapping functions 34, 44 are then output to a combinational circuit means 32, which in this case is illustrated as an adder, to produce the desired EGR value. In this representation a first operating parameter, manifold absolute pressure, forms a base pulse width for the desired EGR value and a correctional pulse width value which is the coolant temperature value is added thereto and subsequently output from the processor means. Thus, the base value is increased for different temperature values according to one of the objects of the invention.

It is to be noted that the combinational circuitry 32 could be much more complex than is illustrated in the FIG. 1, and other engine variables could be mapped to produce other pulse widths combined in various functional relationship with the dual system shown. As shown in the cross referenced applications throttle angle is another engine parameter one could advantageously combine into the base or correctional values, or instead of MAP, airflow could be sensed, etc.

Figure 3:
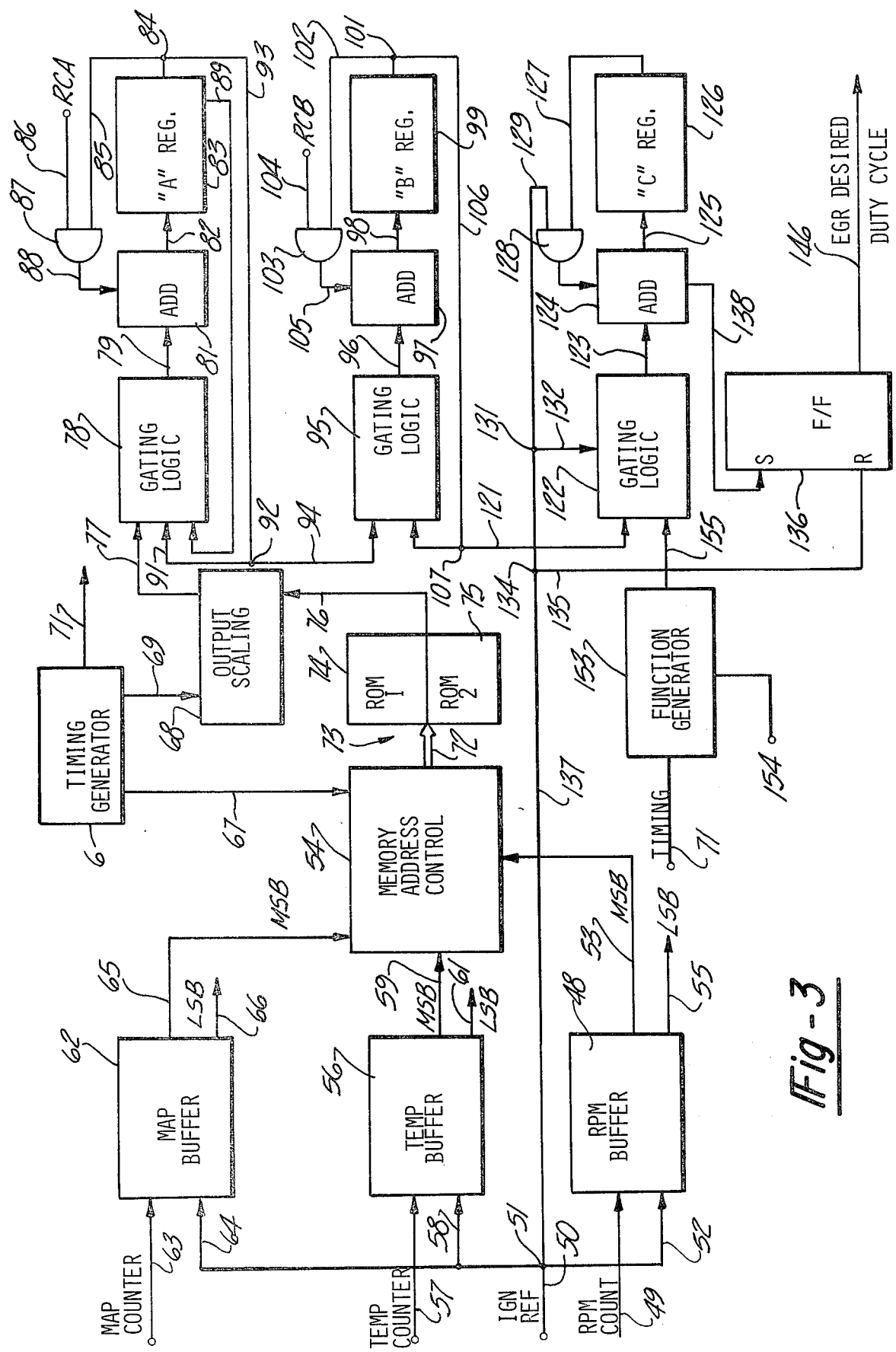
FIG. 3 is a detailed block diagram of circuitry comparision an electronic processor means that is illustrated in FIG. 1.

With reference now to FIG. 3, there is shown a more detailed schematic block diagram of the preferred implementation of the electronic processor means 51. The period timer 34 in FIG. 1 supplies a multi-bit binary number count indicative of the engine speed to one input of the RPM buffer register 48 via data path 49. A source of predetermined ignition reference pulses, used for reset purposes, are supplied via lead 50 to a common reset node 51, and then via lead 52 to the reset input of the RPM buffer 48. The first multi-bit binary number or word received from the RPM counter of block 34 is temporarily stored within the RPM buffer 48. A first data path 53 couples one set of outputs of the buffer 48 to a first set in inputs to the memory address control circuitry ob flock 54 so that the most significant bits (MSB) of the first multi-bit binary number, indicative of engine speed and stored within the buffer 48, may be used for memory address purposes. A second set of outputs from the buffer 48 is supplied via a data path 55 to output the least significant bits (LSB) of the first multi-bit binary number for use in performing an interpolation operation as described more fully herein.

The coolant temperature buffer 56 receives a second multi-bit binary number or word from the analog-to-digital converter 46 via data path 57 and periodic reset pulses from the common reset node 51 via lead 58. One set of outputs of the coolant temperature buffer 56 is connected via data path 59 to the memory address control circuitry of block 54 for supplying the MSB's of the second multi-bit binary number, indicative of a coolant temperature, while a second set of outputs is coupled to data path 61 for outputting the LSB's of the second multi-bit binary number for use in the interpolation process.

The MAP buffer 62 has one input adapted to receive a third multi-bit binary number or word from the analog-to-digital converter 38 via data path 63, and a second reset input adapted to receive the periodic ignition reference reset pulses from common reset node 51 via lead 64. One set of outputs of the MAP buffer 62 is coupled via data path 65 to another set of inputs of the memory address control circuitry 54 for supplying the MSB's thereto for memory address purposes, while a second set of outputs is coupled to data path 66 for outputting the LSB's of the third multi-bit binary number or word for use in the interpolation process. A timing generator, represented by block 6, supplies timing pulses to the memory address control circuitry of block 54 via data path 67 to output scaling circuitry of block 68 via lead 69 and to other outputs represented generally by data path 71 for use in controlling the cycle of computations and operations of the present system as described herein.

The various outputs from the memory address control circuitry of block 54 are represented generally by data path 72, which are used to address the memory means 73, which includes a first memory section or ROM 74 which is preprogrammed for storing a lookup table of optimal EGR values indicative of a desired EGR as a function of engine speed, or period, and coolant temperature; and a second memory section, or ROM 75, which is preprogrammed with a lookup table or schedule of optimal EGR values indicative of a desired position determined as a function of engine speed and MAP. The output of the memory means 73 is coupled via data path 76 to the circuitry of the output scaling block 68, whose output is coupled via data path 77 to one input of the gating logic of block 78. The output of the gating logic of th block 78 is connected via data path 79 to the add circuitry of block 81, whose output is coupled via data path 82 to the input of the first "A" shift register 83, whose primary output is connected directly to the "A" register output node 84. Node 84 is connected via lead 85 to one input of an AND gate 87, whose other input is connected via lead 86 to a source of RCA (recirculate "A") pulses generated elsewhere in the circuitry as described hereinafter.

The output of the gate 87 is connected via lead 88 to the add circuitry of block 81. Furthermore, an intermediate stage outut of the "A" register 83 is connected via lead 89 back to a second input of the gating logic of block 78. A third input to the gating logic circuitry of block 78 is connected via lead 91 to a node 92, which in turn is connected via lead 93 to the output node 84 of the "A" register 83 for recirculating the contents thereof on command.

Node 92, which receives the output or contents of the "A" register 83, is also connected via lead 94 to one input of a second gating logic network 95 whose output is connected via data path 96 to one input of the add circuitry of block 97. The output of the add circuitry of block 97 is connected via data path 98 to the input of a second "B" register 99 whose primary output is taken directly from the "B" register output node 101. The output node 101 is connected via lead 102 to one input of an AND gate 103 whose other input is connected via lead 104 to a source of RCB (recirculate "B") pulses which are generated as hereinafter explained. The output of AND gate 103 is coupled via lead 105 to another input of the add circuitry of block 97. Output node 101 is also connected via lead 106 to a node 107 and thence via lead 108 back to a second input of the second logic gating circuitry of block 95.

Node 107, which receives the output of the "B" register 99 via output node 101 and lead 106, is also connected via lead 121 to one input of the fourth gating logic network 122 whose output is connected via data path 123 to one input of an adding circuit 124. The output of the add circuitry of block 124 is connected via lead 125 to the input of the "C" register 126 whose primary output is connected via lead 127 to one input of an AND gate 128 whose other input is connected via lead 129 to a node 131. Node 131 is connected to another input of the gating logic network 122 via lead 132 and via lead 133 to a node 134. Node 134 is connected directly to the reset input of a standard RS flipflop 136 via lead 135 and to the common reset node 51 via lead 137.

Another output of the add circuitry of block 124 is connected via lead 138 to the set input of the RS flipflop 136. The high or "Q" output of the flipflop 136 is not used. The Q output of flipflop 136 is coupled to a lead 146 to supply an EGR signal indicative of the duty cycle thereof. This signal is a variable duty cycle fixed amplitude wave where the percentage of on time to off time is indicative of the desired EGR value.

The function generator of block 153 has a timing input coupled to one of the output leads 71 of the timing generator block 66 and another input coupled via lead 154 to a source of external control signals as hereinafter described. The output of the function generator 153 is connected via data path 155 to another input of the gating logic network 122 to assist in the generation of the EGR valve control signal and to selectively alter the same in a closed loop manner under the influence of external engine operating parameters if desired.

Figure 2:
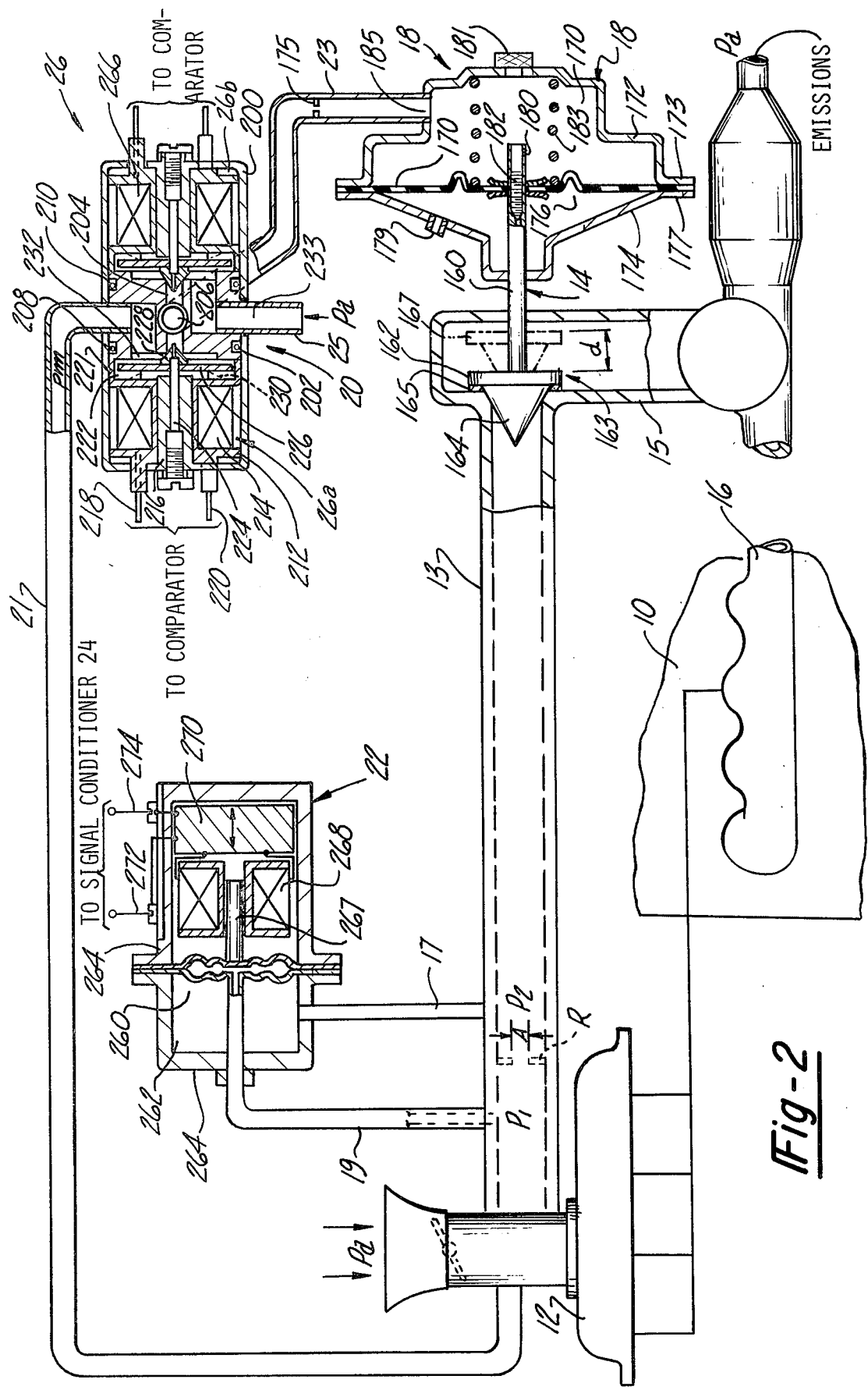
FIG. 2 is a partially sectioned and partially schematic diagram of the EGR control loop illustrated in FIG. 1.

The overall operation of the closed loop EGR control system of FIGS. 1 and 2 will now be briefly described. The first ROM 74 is preprogrammed with a first schedule or lookup table of EGR values representative of a set of desired positions of the EGR valve as a function of engine speed or load and engine coolant temperature. The second ROM 75 is preprogrammed with a second schedule or lookup table of optimal EGR values representative of a set of desired positions of the EGR valve as a function of engine speed and absolute manifold pressure or airflow.

The engine operating parameters, in the preferred embodiment, engine speed, engine coolant temperature and absolute manifold pressure are sensed and converted to a first, second and third multi-bit binary numbers which are indicative of engine speed, engine coolant temperature and MAP, respectively. the first, second and third multi-bit binary numbers are temporarily stored in the RPM buffer 48, temperature buffer 56 and MAP buffer 62, respectively.

Using appropriate timing signals from the timing generator 6, the memory address control circuitry of block 54 selects the MSB's of the first and second words indicative of engine speed and engine coolant temperature from their respective buffers 48, 56 and addresses first and second dimensions of the first memory portion 74 to read out the value stored therein. This value is fed via the output scaling circuitry of block 68, the gating logic 78, and add circuitry 81 to the "A" register 83, and it is modified therein by a double linear interpolation procedure using the LSB's of the first and second words via data paths 55 and 61, respectively. Adjacent memory locations of the first memory section 74 are sequentially addressed under the influence of the memory address control circuitry of block 54 and commands from the timing generator 66 to provide the values necessary for the interpolation. At the end of the interpolation process, the desired first EGR value representing the desired value corresponding to the actual measured values of engine speed and engine coolant temperature is stored in the "B" register 99.

The second preprogrammed memory portion 75 is then addressed with the MSB's of the first and third words stored in buffers 48 and 62 respectively to output the value stored therein to the output scaling circuitry of block 68 to the input of the gating logic of block 78. Successive adjacent values are addressed as required for the interpolation process and a double linear interpolation is performed using the LSB's of the first and third words as previously described until the second EGR value indicative of the desired position of the EGR valve corresponding to the actual measured values of engine speed and MAP are computed and added to the first EGR value with the sum representing a desired corrected value being stored in the "B" register 99.

The desired EGR value is fed into the gating logic network 122 and added via block 124 to the "C" register 126 as a binary number or count. The function generator 153 establishes a count rate and subtracts a predetermined constant value from the count stored in the "C" register 126 via gating logic 122 and the adding circuitry of block 124. Once the "C" register 126 has been preset with the value stored in the "B" register 115, the contents of the "B" register are decreased by the fixed amount established by the function generator 153 at the predetermined rate until the contents of the register 126 become less than or equal to zero. The flipflop 136 is initially reset by an ignition reference reset pulse and then set once the bnary number or count is entered into the "C" register and the subtraction process is begun. As soon as the contents of the "C" register 126 become less than or equal to zero, the flipflop 136 is reset. The output of the flipflop 13b is thus a variable frequency pulse dependent upon engine speed and whose duty cycle is as equal to the digital count or desired EGR value stored in the "C" register 126.

Detailed descriptions of the timing of the data movement between register 83, 99 and 126 and circuitry comprising buffers 48, 56 62 are more fully described in the above cross referenced applications. The memory address control 54, timing generator 66, function generator 153 and output scaling circuitry are additionally described in more detail as is the generation of signal RCA and signal RCB. Moreover, the process of the double linear interpolation is more fully set forth therein.

It is seen that a digital electronic processor means 51 has been described for outputting a desired EGR value as a variable frequency and duty cycle wave. Other electronic processors which can calculate an EGR value from the input of a single or multiple engine operating parameter could be used.

For example, an advantageous analog computer having a scheduled set of data points for the input of differing engine parameters is disclosed in U.S. Pat. No. 3,734,068 in the name of J. N. Reddy and titled "Electronic Fuel Control System Including Electronic Means for Providing a Continuous Variable Correction Factor," which is commonly assigned. The disclosure of Reddy is herein incorporated by reference. Reddy illustrates a schedule for MAP versus speed with correction for other operating parameters to provide a variable pulse width for controlling the opening times of a group of fuel injectors. The variable pulse width is output with respect to engine speed and could if the correction factor was desired as engine coolant temperature provide a similar desired EGR value of variable duty cycle for the system disclosed herein.

Attention should now be directed to FIG. 2 where preferred complementations of the EGR valve 14, the EGR actuator 18, the pilot stage 20, solenoid 26, and the feedback sensor 22 are illustrated to advantage.

The EGR valve 14 is a preferred form has an elongated stem to which is affixed at its distal end a variable orifice valve means 163 which includes a radial flange or rim 162 and a connically shaped spire member 164 centered thereon. The rim 162 mates with a valve seat 165 to seal exhaust gas from passing through an orifice formed by the valve seat at the junction of the exhaust gas pickup conduit 15 and the intake manifold conduit 13.

The valve means provides an increasing annular passage through the orifice as the stem 160 is transported to the right as seen in the figure. At the point where the tip of the spire is directly opposite the valve seat 165 as shown by the dotted valve means 167, the passage will be fully open. It is evident that a variable amount of exhaust gas can be recirculated from the exhaust manifold to the intake manifold by moving the valve means between the two extremes of fully open and fully closed over the travel of a distance, d.

The amount and rate of change of the recirculated exhaust gas will be influenced by the geometry of the spire and the speed at which the stem 160 is transported. In the embodiment illustrated the spire is conical with a linear slope to provide the annular passage with a constant rate of change in cross-sectional area for a constant speed of movement of the valve means. The spire, however, could be more complex in shape to produce a different functional relationship as would be obvious to one skilled in the art.

The valve means is controlled in its excursions by the EGR actuator 18. The actuator 18 includes a generally cup-shaped casing member 172 formed with a lip 173 and defining within a first chamber 170. The casing member 172 is assembled with an opposing casing member 174 having a lip 177 and defining a second chamber 176. Separating the chambers 170, 176 from each other and crimped between the lips 173, 177 of the casing members is a pressure sensitive flexible diaphragm 178.

The diaphragm 178 will move according to the difference in pressures of the chambers 170, 176 by flexing toward the lower pressure and away from the higher. The valve stem 160 and diaphragm are attached and move in concert. Attaching the stem 160 at its proximal end to the diaphragm 178 is a set screw 182 which threads it into a bore in the stem.

The screw 182 is used to adjust the initial seating of the valve means against the seat 165 or to provide an offset (either closed or open) for the EGR valve 14. Adjustment may be made by removing a seal 181 and adjusting through guide tube 180. Normally, for a closed throttle or initial conditions the screw 182 will seat the valve means and a bias spring 183 closes the valve in order to prevent any substantial EGR. Thus, a failure of the vacuum or control signals of this system will result in no EGR recirculation.

Each of the chambers 170, 176 can be individually pressurized through ports 185, 179 respectively. In the implementation illustrated, port 179 is vented to the atmosphere and port 185 communicates with the pilot supply line 23. The pilot supply line under control of the pilot stage 20 and solenoids 26 alternatively provides either a vacuum (negative pressure) at a constant rate or a vent (atmospheric pressure) at the same rate. Thus, a mechanical integration of the vacuum rate is provided by the first chamber 170 which acts as a storage device. A restriction 175 controls the rate of vacuum or vent. The vacuum level increases at the rate supplied by the pilot line or conduit 23 or decreases at the same rate when vented to the atmosphere. The diaphragm is then positioned by the level of vacuum in the first chamber and positions the valve means therewith.

The pilot conduit 23 is alternately supplied with either vacuum via pressure line 21 or an atmospheric vent via vent 25 by the dual action of the pilot stage generally shown as 20 cooperating with the solenoid 26 which is divided into a first section 26a and a second section 26b.

The pilot stage 20 comprises a generally cylindrical casing 200 in which is centrallly located a disc shaped core 202. The core 202 is provided with a central coaxial bore 204 to form a common channel for pressure communication to the pilot conduit 23 through an exit port 206. O rings 208, 210 seal the core 200 from the differing pressures of each side.

The solenoid sections 26a, 26b are similar and the explanation of the operation of one will suffice for an understanding of both. Section 26a is formed by a solenoid form 212 on which a coil 214 is wound. The solenoid form is located within the casing 200 by an upraised boss 216. The solenoid form 212 is further provided with terminals 28, 220 electrically connected to coil 214 for energization of the section 26a.

The solenoid form contacts one face of core 202 with a peripheral up-raised flange 221 to form a chamber 222 communicating pressure from the side exit port to the central bore 204. Located within a central bore of the boss 216 is a valve stem 224 a wafer shaped pole piece 226 at its distal end on which is located a valve 228.

The pole piece is generally formed of a magnetic material and is biased by a spring 230 to move with and seat the valve 228 against the bore 204 in a sealing relationship through a slight counter bore 232 in the core 202. When the valve 228, formed preferably of an elastomeric sealing material such as rubber or the like, seals the bore, pressure communication between the side port 232 and bore is eliminated. By energizing coil 214 by the terminals 218, 220 the pole piece, by being attracted to the boss and form, will overcome the bias of the spring and open the valve. Likewise, energization of the coil 226 of section 26b will cause the normally closed valve of that section to open and cause communication between side port 233 and the central bore 204. Thus by alternately energizing the coils 214, 266 the conduit 23 will be supplied with either vacuum (Pm) via conduit 21 or a vent (Pa) via conduit 25.

Another source of vacuum could be provided to conduit 21 but generally manifold vacuum is used to advantage. It should be noted at full power settings with wide open throttle the vacuum will be very low and the EGR valve either closed or nearly closed. Although vacuum and atmospheric pressure are shown as operating the actuator 18, any other muscle source such as positive pressure, exhaust pressure, secondary air, or others could easily be utilized.

The feedback sensor 22 which provides an analog signal representative of the actual EGR flow through the recirculation loop will now be more fully described. In a preferred form the sensor is illustrated as a differential pressure transducer having a belows 260 with an internal pressure connection to the downstream side of restriction R via conduit 19. The bellows 260 is located within a pressure chamber 262 of a casing 264 of the sensor 22. The chamber provides an external pressure to the outside of the bellows by being connected to the upstream side of the restriction R via conduit 17. The difference in pressures between the dowstream side $P_1$ and upstream side $P_2$ caused by the EGR flow past the restriction cause the bellows to expand or contract in proportion with their pressure difference, $P_2 - P_1$ or $\Delta P$.

The smaller the open cross-section A of the restriction R, the higher the differential pressure will be and the easier it will be to measure accurately. However, measuring the pressure and actual EGR flow in this manner assumes a restriction large enough to provide subsonic EGR flow without compressibility factors. The restriction further must be large enough to provide for the maximum EGR flow needed by the engine 10. Conventionally, a venturi or other shaped restriction may provide a measurable $\Delta P$ as is known.

The bellows 260 is attached to a tuning slug 267 which cooperates with a coil 268 to form a linear motion transducer. The sensor can contain additional electronics 270 electrically connected to the coil 268 to sense the change in inductance caused by the motion of the slug 266. The electronics 270 are in turn electrically connected to terminal 272, 274 to provide an output to the signal conditioner circuit more fully describer hereinafter. An advantageous sensor that will perform the functions described and is a preferrred differential pressure transducer model number (GS-618-13-4S) manufactured by Gulton Industries of Costa Mesa, Calif.

Figure 4:
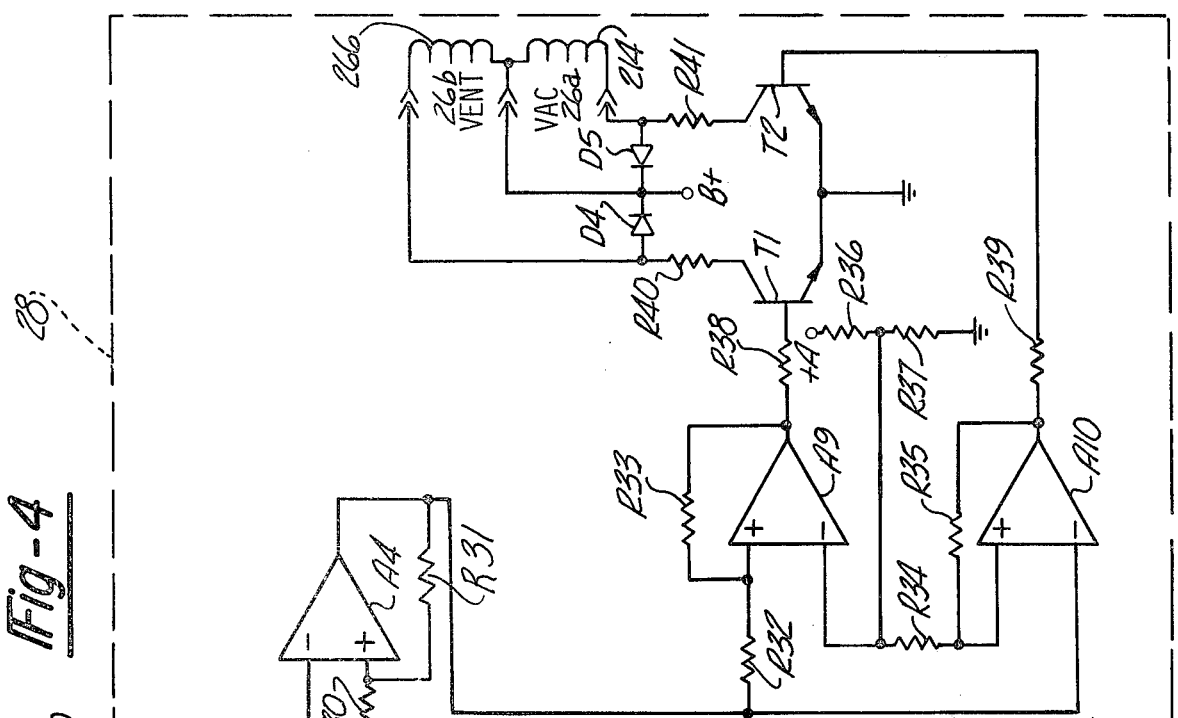
FIG. 4 is a detailed electrical schematic diagram of circuitry comprising the pulse width to voltage generator, signal conditioner, and comparator illustrated in FIG. 1.
Figure 4:
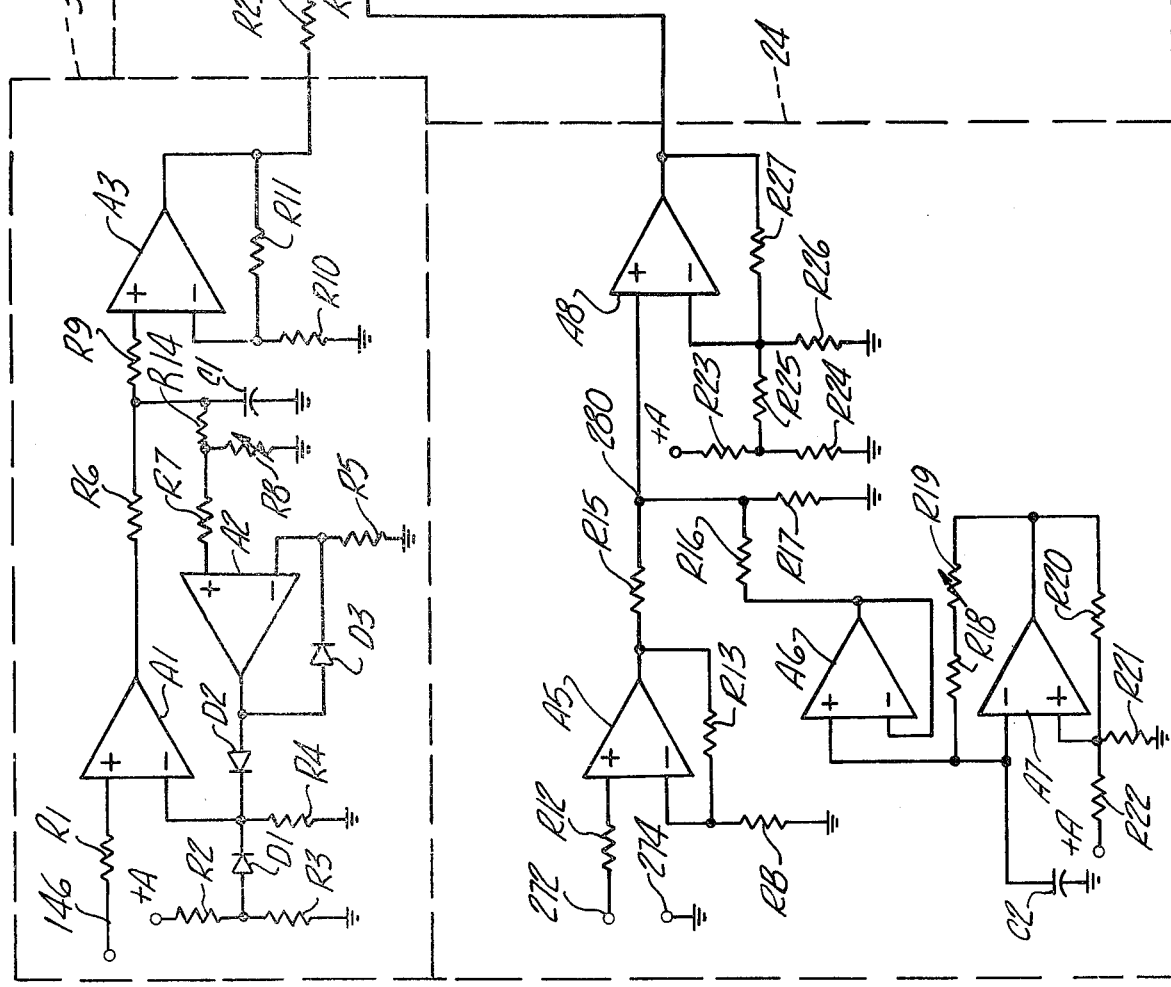

FIG. 4 illustrates detailed circuitry comprising the signal conditioner 24, pulse width to voltage generator 30 and comparator 28. The pulse width to voltage generator 30 is comprised of the circuitry associated with amplifiers A1, A2 and A3. The variable duty cycle input from the electronic processing means 51 is communicated via resistor R1 to the noninverting input of amplifier A1. Amplifier A1 also has a biasing network comprising resistors R2, R3 and R4. Resistors R2 and R3 are connected serially between a voltage source, +A, and ground and the anode of diode D1 is connected between the junctions of those resistors with its cathode connected to the resistor R4. At the node formed thereby is connected the inverting input of amplifier A1. This biasing network provides a constant positive source of voltage via diode D1 to the resistor R4 for presenting a constant voltage to the inverting input of the amplifier A1.

The output of the amplifier A1 feeds an integrating capacitor C1 through a resistor R6. The capacitor is connected between the junction of the resistor R6 and a resistor R9 and ground, and further connected at this node of the integrating capacitor C1 is a divider network formed by a resistor R7 and a bleed resistor R8. The bleed resistor R8 is connected between the node and ground and the resistor R7 is connected between the node and the noninverting input to an amplifier A2.

The input from the divider network is communicated from output of the ampifier A2 via a diode D2 to the voltage resistor R4 by the connection of the diode to the node of the inverting input of amplifier A1. A feedback diode D3 is connected betwen the output of the amplifier A2 and the inverting input. A linear resistor R5 is connected between the inverting input of the amplifier A2 and ground for generating a voltage from the feedback provided by diode D3.

Further comprising the pule width to voltage generator 30 is a scaling amplifier A3, which receives its input from the capacitor C1 via the resistor R9 to its noninverting input. The output of amplifier A3, which is noninverting, is scaled by a set of gain resistors R11 and R10 where R11 is connected between the amplifier output and its inverting input and R10 is connected between the inverting input of the amplifier and ground. The scaling resistors are to scale the gain or scale the signal of the duty cycle input to be an analog measure of the desired EGR value so that it may be compared with the actual. Thus, the gain of the scaling amplifier A3 may be modified to provide a signal of equivalent magnitude to the corresponding signal for actual EGR value.

In operation the amplifier A1 provides a signal that is similar to the variable duty cycle input, rising and falling with the edges thereof, to the capacitor C1 which integrates the input pulses into an analog voltage. The capacitor C1 discharges through the bleed resistor R6 which will provide a discharging time constant so that the variable duty cycle pulses will produce differing voltages on the capacitor C1. The amplifier A2 will reproduce the voltage on the capacitor C1 and communicate it to the resistor R4 whereby the threshold at the inverting input will rise with the rising voltage of the capacitor to where a clamping will take place on the amplifier A1. By adjusting the resistor R8 the clamping may be used at various duty cycles but preferably is used for approximately the 100 percent duty cycle of the input. Thus as the duty cycle and the input varies from 0 to 100 percent, the voltage output from the generator 30 will vary from approximately 0 to 8 volts.

The circuitry comprising signal conditioner 24 will now be more fully explained if reference will now be directed to block 24. Amplifier A5 receives an actual EGR value via resistor R12 which is connected to the noninverting input of amplifier A5. The actual EGR value is developed as an analog voltage from the sensor via terminals 272, 274. The amplifier A5 is a noninverting gain producing amplifier consisting of feedback resistor R13 connected between the output and the inverting input and a divider resistor R8 connected between the inverting input and ground.

The amplified actual EGR signal from the amplifier A5 is input to a summing node 280 via a resistor R15. The actual EGR signal is mixed at the node 280 with a triangular oscillation signal input to the node via resistor R16, which two signals in the relative proportions of their input resistance form a voltage across a resistor R17 connected between the node 280 and ground. The triangular voltage is generated by an oscillating amplifier A7 having a timing capacitor C2 connected between its inverting input and ground and a positive feedback resistor R20 connected between its output and noninverting input. The noninverting inut of amplifier A7 is further connected to the junction of a voltage divider bias network having a resistor R22 and are resistor R21 connected between a positive source of supply, +A, and ground. A negative feedback loop consisting of a resistor R18 in series with a variable resistor R19 is connected between the output of the amplifier and the inverting input. The frequency of the triangular signal may be adjusted by resistor R19. Amplifier A6, which receives the output of the oscillator amplifier A7, is a noninverting buffer amplifier having its inverting input connected to the output and its noninverting input connected to the oscillator output at the capacitor C2.

The triangular wave or dither signal is used, as is known in the art, to reduce the peak amplitude of the limit cycle of the controller. The wave is approximately centered at the midpoint of the sensor output by the DC Offset provided by the resistor R21, R22. The frequency of such a signal should be at least ten times the natural limit cycle frequency of the system. In the form shown a 100HZ wave of approximately $\pm 1.0$V with a +4.5V DC off set is advantageously used.

The output of node 280 which is the $\Delta$P or actual EGR value mixed with the triangular wave is communicated to the noninverting input of an amplifier A8. The amplifier A8 is a noninverting amplifier and DC level shifter with a gain of one. Included in the biasing network of amplifier A8 are two equivalent gain resistors R26, R27 in which R26 is connected between the output lead and the node formed at the inverting input of the amplifier, and the resistor R26 is connected between the input node and ground. Further, a threshold voltage is communicated to the input mode of amplifier A8 via a resistor R25 connected to the junction of a divider resistor R23 and a divider resisto R24 wherein the other terminal of resistor R23 is joined to a positive voltage supply +A and the other terminal of R24 is grounded. Operationally, amplifier A8 removes the DC level from the actual EGR value mixed with the triangular wave.

Thereafter, the desired EGR value is input to the inverting input of an amplifier A4 via an input resistor R29. Likewise, the actual EGR value with the super imposed triangular waveform is input to the noninverting input of amplifier A4 via an input resistor R30. The amplifier A4 which is used as a comparator further has a gain resistor R31 connected between its output lead and the non-inverting input. Depending on which input is higher, the comparator amplifier A4 will switch in one direction or the other. The amplifier A4 will have a relatively high output for those conditions in which the actual EGR value is greater than the desired EGR value and consequently will have a relatively low output for those conditions in which the desired EGR value is greater than the actual.

The relatively high output from the comparator amplifier A4 is communicated to a high gain switching amplifier A9 via an input resistor R32 connected to its noninverting input. A threshold is provided for the amplifier A9 by the series connection of a divider resistor R36 and a divider resistor R37 being connected between a source of positive voltage supply +A and ground. The junction of the dividers resistors R36, R37 are connected to the inverting input of the amplifier A9. Further, a latching resistor R33 is connected between the output of the amplifier A9 and the noninverting input to provide a positive feedback for rapid slopes.

An amplifier A10, having a threshold provided by a resistor R34 connected to the junction of the divider resistors R26 and R37 at one terminal and having the other terminal connected to the noninverting input of the amplifier, is used for amplification similarly to amplifier A9. A latching resistor R35 providing positive feedback is connected between the output and the non-inverting input of the amplifier A10. the inverting input of the amplifier A10 is connected to the output of the comparator amplifier A4 and is capable of receiving the relatively low signal therefrom to produce a positive output. The gain amplifiers A9 and A10 are shaping amplifiers which alternately turn on transistors T1 and T2 respectively when their values are high.

Transistor T1 connected to the output of amplifier A9 by transistor R38 to its base and to ground at its emitter is a driving transistor having a load formed by the serial connection of a positive voltage supply +B, an inductance 266 and a resistance R40. The inductance 266 is energized when the transistor T1 is turned on by a positive-going pulse of the amplifier A9. The inductance 266 further has a reverse connected diode D4 for assisting in fast turnoff times of the conductor when the transistor T1 is shut off. The inductance 266 is the coil used to vent the actuator 18.

Similarly, the driving transistor T2 has its emitter connected to ground and its base connected to the output of the amplifier A10 via a bias resistor R39. The load for transistor T2 in series comprises the inductance 214 connected to the positive supply +B and a current limiting resistor R4 connected to the collector. The inductance 214 also has a reverse connected diode D5 for assisting in fast turnoff times of the inductor when the transistor T2 is shut off. In operation the transistor T2 will energize the inductance 214 when the base receives a positive pulse from amplifier A10. The inductance 214 is the coil inductance of the vacuum section of actuator 18.

The control system will thus set up an integral limit oscillation based upon the vacuum or vent rate of the EGR actuator 18. The system will constantly compare the actual and desired values of the EGR to attempt to reduce the error to zero as the pilot valve 20 switches in its on-off mode. The authority of the controller or difference between median value and the peak value of the EGR flow oscillation will be reduced by the dither signal. The median value will change as a function of the desired value and the controller will follow accordingly in a closed loop manner.

Therefore, it is seen that a closed loop programmable EGR controller has been shown and described to advantage in the above detailed description. While the preferred embodiments for the invention have been shown, there are modifications or changes or alternatives thereto which will be obvious to those skilled in the art and may be made without parting from the above described invention. It is, therefore, the intent to cover all such modifications or changes that are within the true scope and spirit of the invention as defined by the hereafter appended claims.

What is claimed is:
1. An EGR system for an internal combustion engine comprising:
an electronic processor means for generating a desired EGR value as a function of the operating parameters of the internal combustion engine;
a sensor means for generating an actual EGR value by sensing the actual flow of exhaust gas through a recirculation loop;
a variable EGR valve means disposed in said recirculation loop, said valve means operable to vary the amount of exhaust gas passing through said recirculation loop;
control means for comparing said desired EGR value to said actual EGR value, said control means generating an increase signal when said actual EGR value is less than said desired EGR value as a result of the comparison and generating a decrease signal when said actual EGR value is greater than said desired EGR value as a result of said comparison, the control means further regulating the EGR valve in response to the increase and decrease signals to descrease EGR flow at a controllable rate in the event of a decrease signal and to increase EGR flow at a controllable rate in the event of an increase signal.

2. An EGR system as defined in claim 1 wherein:
said sensor means for generating an actual EGR value includes a control orifice with a predetermined orifice area for passing exhaust gas through, said control orifice located in said recirculation loop such that it forms a restriction to passage of the recirculated portion of the exhaust gas within the loop; and differential pressure transducer means for generating a pressure sensor output signal proportional to the pressure difference between the upstream and downstream sides of said orifice in said exhaust gas recirculation loop, said pressure differential being an actual measurment of the mass flow of said exhaust gas in the recirculation loop and said pressure sensor output signal being the actual EGR value to said control means.

3. An EGR system as defined in claim 2 wherein:
said control means further includes a pilot valve stage having a pilot supply line connected to said EGR valve means and responsive to said increase signal to supply a source of vacuum to the EGR valve means at a constant rate over said pilot supply line and responsive to said decrease signal to supply a source of atmospheric pressure to the EGR valve means at a constant rate over said pilot supply line.

4. An EGR system as defined in claim 3 wherein:
said EGR vale means comprises, a moveable valve stem with a valve at one end fitting against a valve seat forming a portion of the recirculation loop, wherein movement of said stem will more the valve away from said seat and allow a variable amount of recirculation therethrough depending upon the distance of the movement; and an EGR actuator means including a first enclosed pressure chamber and a second enclosed pressure chamber separated by flexible diaphragm means, said diaphragm means variably positioned in relation to the pressure difference between said first and second chambers and attached to said stem; said pilot supply line communicating with one of said chambers and the other chamber vented to atmospheric pressure whereby the position of the stem is controlled by the pressure level of the chamber and is controllably changed at the constant rate by said pilot valve means.

5. An EGR system as defined in claim 4 wherein:
said control means further comprises limit means for limiting the oscillations of said EGR flow produced by said system to a narrow band of values to more closely approximate the desired EGR value by the actual exhaust gas recirculation.

6. An EGR system for an internal combustion engine as defined in claim 1 wherein:
said electronic processor means includes combinational means for combining a plurality of operating EGR valves that are functions of various operating parameters of the engine into said desired EGR value.

7. An EGR system for an internal combustion engine as defined in claim 6 wherein:
said electronic processor means includes a first operating parameter value generation means and a second operating parameter value generation means;
said first parameter means for receiving a signal from an engine sensor representative of a value of a first operating parameter sensed and for generating a first EGR operating value therefrom to sid combinational means; and
said second parameter means for receiving a signal from an engine sensor representative of a value of a second operating parameter sensed and for generating a second EGR operating value therefrom to said combinational means wherein the desired EGR value is a combination of said first EGR operating value and said second EGR operating value.

8. An EGR system for an internal combustion engine as defined in claim 7 wherein:
said first operating parameter is manifold absolute pressure and said second operating parameter is coolant temperature and wherein said first EGR operating value represents a base value to be modified by said second EGR operating value.

9. An EGR system for in internal combustion engine as defined in claim 8 wherein:
said combination means comprises an adder to increase said first EGR operating value by said second EGR operating value.

10. An EGR system for an internal combustion engine as defined in claim 9 wherein:
said first parameter means includes first storage means for storing EGR operating values as a function of manifold absolute pressure and RPM, and
said second parameter means includes second storage means for storing EGR operating values as a function of coolant temperature and RPM.

11. An EGR system for an interval combustion engine as defined in claim 10 wherein:
said first storage means comprises a read only memory containing said EGR operating values in a lookup table, and first memory access means for addressing the stored valves in response to the input of digital numbers representative of MAP values and RPM values, said addresses of the EGR values being determined by the function relating the MAP values and RPM values to the EGR value such that a three-dimensional mapping exists for all stored EGR values.

12. An EGR system for an internal combustion engine as defined in claim 11 wherein:
said second storage means comprises a read only memory containing said EGR operating values in a lookup table, and second memory access means for addressing the stored values in response to the input of dihgital numbers representative of coolant temperature values and RPM values, said addresses of the EGR values being determined by the function relating the coolant temperature values and RPM values to the EGR values such that a three-dimensional mapping exists for all stored EGR values.

13. An EGR system for an internal combustion engine as defined in claim 12 wherein:
said first memory access means and said second memory access means include interpolation means for interpolating between stored EGR values for values of the operating parameters not in the mapping function.

* * * * *